United States Patent [19]
Dusich et al.

[11] 4,069,611
[45] Jan. 24, 1978

[54] DOWNRIGGER FOR TROLLING

[76] Inventors: Jerry G. Dusich, 4898 Washington St., Gary, Ind. 46408; Willard Basco, 1009 E. 61st Place, Merrillville, Ind. 46410

[21] Appl. No.: 759,255

[22] Filed: Jan. 14, 1977

Related U.S. Application Data

[63] Continuation of Ser. No. 606,922, Aug. 22, 1975, abandoned.

[51] Int. Cl.² ............................................... A01K 91/00
[52] U.S. Cl. .................................................... 43/43.12
[58] Field of Search ...................... 43/43.12, 43.1, 25, 43/42.74

[56] References Cited

U.S. PATENT DOCUMENTS

| | | | |
|---|---|---|---|
| 484,254 | 10/1892 | Settle | 43/43.1 |
| 1,193,912 | 8/1916 | Maire et al. | 43/43.1 |
| 2,730,830 | 1/1956 | Smith | 43/43.12 |
| 2,749,648 | 6/1956 | Schneider | 43/43.12 |
| 2,791,858 | 5/1957 | Kernodle | 43/25 |
| 3,816,954 | 6/1974 | Bissonette | 43/43.12 |
| 3,930,330 | 1/1976 | Black | 43/43.12 |
| 3,961,437 | 6/1976 | Lewis | 43/43.12 |

Primary Examiner—Warner H. Camp
Attorney, Agent, or Firm—Walter Leuca

[57] ABSTRACT

Trolling apparatus including a weighted down line and a bracket adapted to be engaged to the down line at any point thereof, the bracket being capable of receiving lead lines, or having a release assembly for a separate fishing line. Means are provided to hold the fishing line until a predetermined pressure is reached and to release the fishing line without abrasion thereof. Provision is made for a modified form of the invention in which the release assembly is pivotally mounted to provide for upward and downward movement of the fish.

5 Claims, 12 Drawing Figures

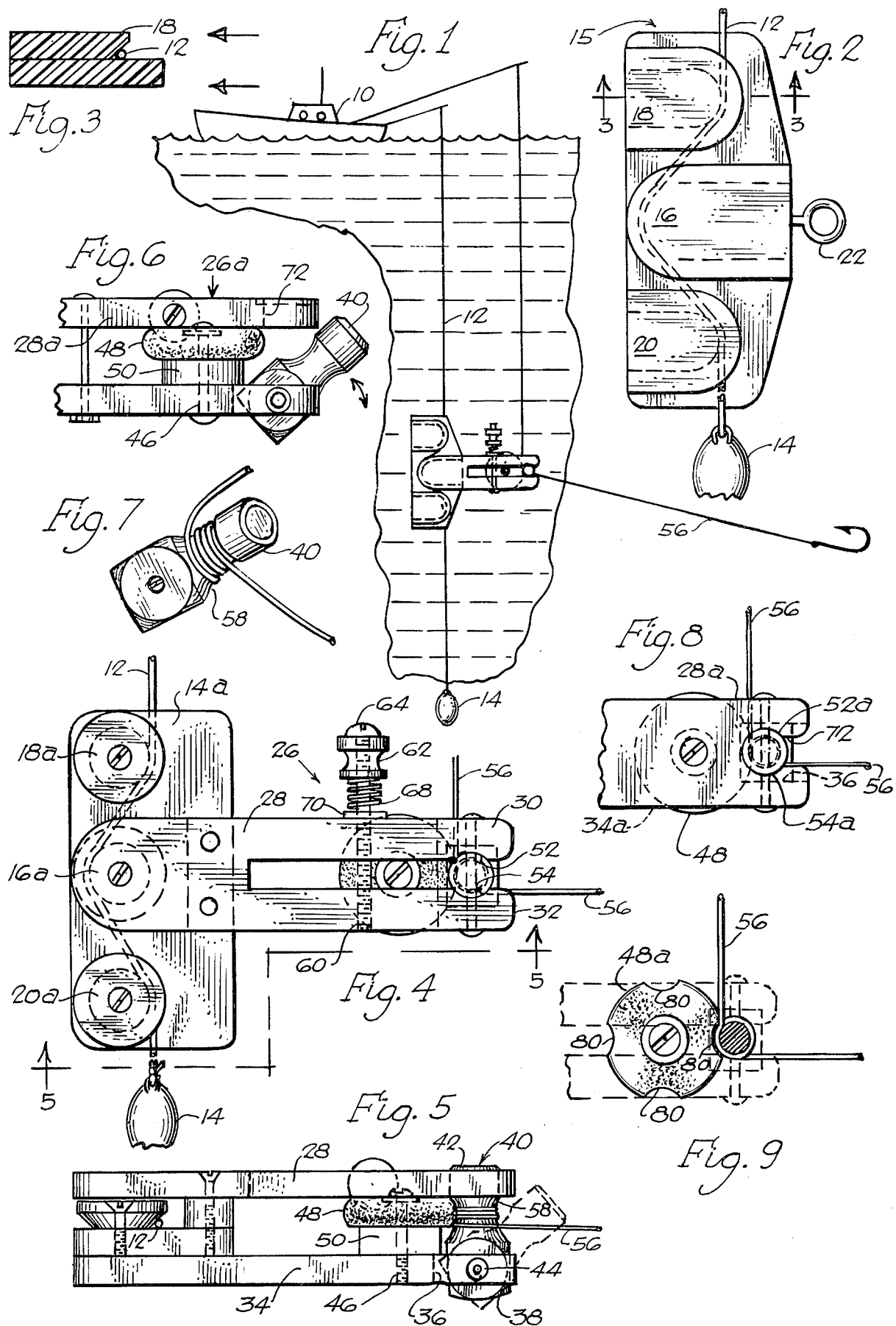

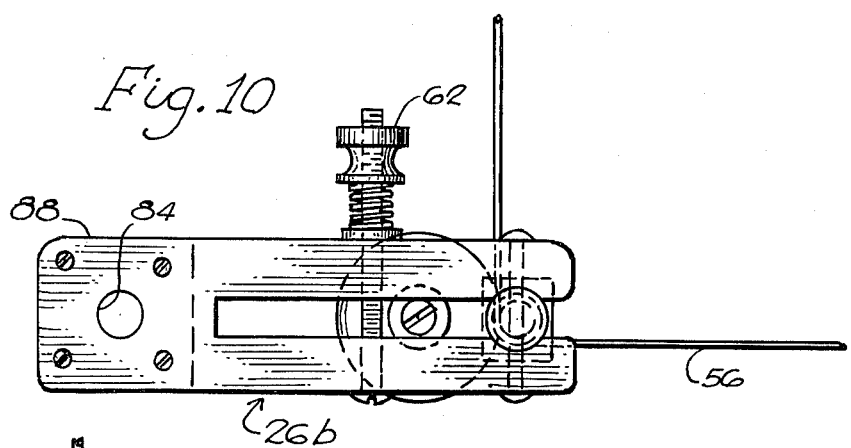
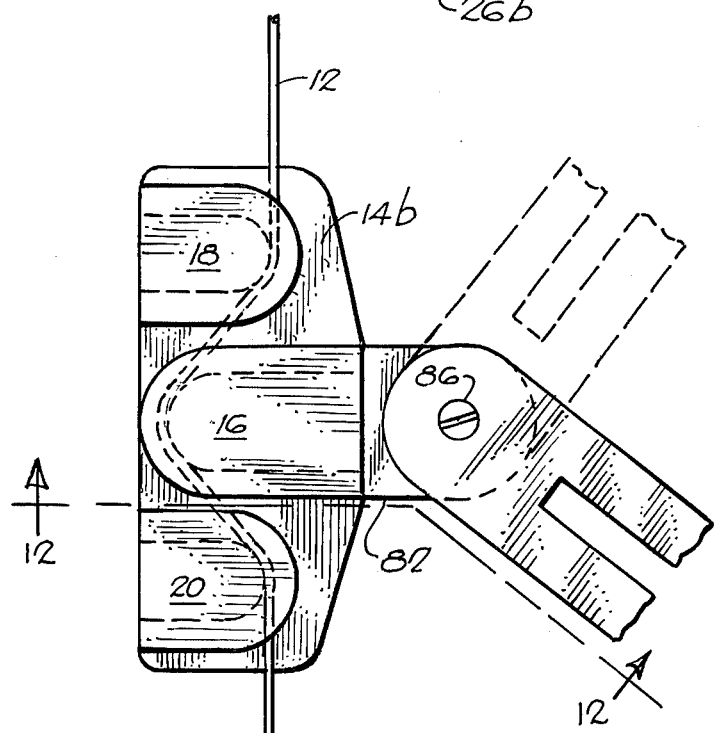
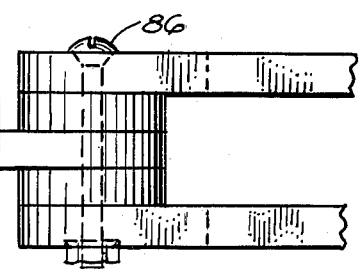
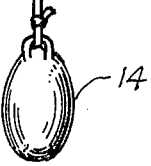

DOWNRIGGER FOR TROLLING

BACKGROUND OF THE INVENTION

This is a continuation of application Ser. No. 606,922, filed Aug. 22, 1975 and now abandoned.

RESUME

Various types of downrigger release devices have been proposed for trolling for fish. The concept is to trail the fishing line substantially parallel to the surface of the water while the fishing boat moves slowly. This is conventionally done by having a weighted down line which may be of heavy filament, stainless steel cable, or the like. Various release assemblies have been devised in connection with a down line but have the serious disadvantage of abrading the fishing line so that breakage readily occurs. This invention contemplates the provision of one or more brackets that may be frictionally attached to the down line at any point along its length. The bracket may have a simple screw-eye for reception of a lead line or may have a release assembly formed integrally therewith for locking the fishing line against a resilient snubber by means of a pivotal pin which is frictionally locked in an adjustable manner in the release assembly so that the fishing line is released when a predetermined set pressure is exerted by the fish and the line is free to be wound with a reel by the fisherman in the boat.

BRIEF DESCRIPTION OF THE FIGURES

FIG. 1 is an elevational view, diagrammatic in nature, showing a boat trolling to the left, as viewed in that figure, with the downrigger assembly of the present invention attached to the conventional down line;

FIG. 2 is an enlarged elevational view of a bracket forming a part of the present invention and having means for securing a lead line or the like;

FIG. 3 is a sectional view taken substantially on line 3—3 of FIG. 2;

FIG. 4 is a view similar to FIG. 2 but showing a release assembly connected to the bracket;

FIG. 5 is a view taken substantially on line 5—5 of FIG. 4;

FIG. 6 is a fragmentary plan view of a modified form of release assembly;

FIG. 7 is a view in perspective of a pin forming a part of the release assembly of FIG. 6;

FIG. 8 is a fragmentary elevational view of the form of the invention shown in FIG. 6, as viewed from the top in that figure;

FIG. 9 is a fragmentary elevational view of a further modified form of the present invention;

FIG. 10 is an elevational view of a still further modified form of the present invention illustrating a release assembly which may be pivotally mounted on a bracket of the type illustrated in FIG. 2 or of the type illustrated in FIG. 11 herein;

FIG. 11 is an elevational view of a modified form of bracket adapted to receive the release assembly of FIG. 10; and FIG. 12 is a view taken substantially on line 12—12 of FIG. 11.

DESCRIPTION OF THE PREFERRED EMBODIMENTS

Referring now to the drawing and more particularly to FIG. 1, there is illustrated therein a fishing boat 10 having a down line 12 of heavy monofilament, stainless steel, or the like, provided with a weight 14; this is a conventional type of down line used in many downrigger devices. The downrigger assembly of the present invention includes a bracket 15, of plastic or the like, having formed therein a central capstan 16 and end capstans 18 and 20. The bracket 15 may be secured at any place along the length of the down line 12 merely by wrapping the down line around the capstan 18, thence around the capstan 16, thence around the capstan 20. It will be appreciated that a plurality of brackets of this type may be positioned in spaced relation along the down line 12. In this particular instance the bracket 15 has a screw-eye 22 to which may be connected a lead line for a fish hook or a pivotal release assembly of the type illustrated in FIG. 10.

Referring now to FIGS. 4 and 5, there is illustrated therein a modified form of the present invention in which a release assembly 26 is secured to a bracket 14a which has capstans 16a, 18a and 20a, all of circular configuration but operating in the same manner as the capstans of FIG. 2. It will be understood that the release assembly 26 may be integrally formed with the bracket 14a, if desired. In this instance, the bracket assembly includes a bifurcated side member 28 having tines 30 and 32 and a side member 34 having at the outer end thereof a slot 36 for reception of the base 38 of a pin 40 having a head 42. The pin 40 is pivotally mounted about a pin 44 which extends through the side member 34 as illustrated best in FIG. 5. The side member 34 also has an opening for the reception of a pin 46 on which is mounted a frictional disc 48 spaced from the side member 34 by means of a spacer 50.

It will be noted that the side member 28 has, in spaced relation to the right end thereof, a pair of registered arcuate recesses 52 and 54 in the tines 30 and 32, respectively. These recesses receive the end 42 of the pin 40 and lock fishing line 56 in wrapping relation about indentation 58 in pin 40. It will be noted that with the pin 40 in the position illustrated in FIG. 5, the fishing line 56 is snubbingly engaged about the disc 48 by the locking of the end 42 in the recesses 52 and 54 as illustrated best in FIG. 4. The degree of compression of the tines 30 and 32 against the end 42 of the pin 40 is controlled by moving the tines towards or away from each other. This is done by a screw 60 which passes through the tine 32 and the tine 30 and passes through a milled grommet 62. The bolt 60 has a kerf 64 in case the use of a screw driver is necessary. In the ordinary case the position of the tines can be adjusted merely by twisting the grommet by hand against the force of a spring 68 which extends between the bottom edge of the grommet 62 and a washed 70 positioned on top of the tine 30.

In FIG. 6 is shown a modified form of the present invention in which a release assembly 26a has a pin 40 received in a recess 72 formed in a side member 28a which is not bifurcated as the side member 28 of FIG. 5. The remainder of the component parts is identical to that of FIGS. 4 and 5.

In FIG. 8 is shown an elevational view of the form of the invention shown in FIG. 6. In this form, side member 34a is provided with the opening 36 of the principal form of the invention, while side member 28a has the recess 72 as above explained. The recess 72 is formed with arcuate recesses 52a and 54a in confronting relation to each other to receive the end 42 of the pin 40 in snubbing locking relation.

In FIG. 9 is shown a further modified form of the present invention similar to those shown in FIGS. 4, 5 and 8, but illustrating a flexible disc 48a having a plurality of circumferentially spaced arcuate recesses 80 which may be selectively placed in the right position as illustrated by snubbing wrap relation with a fish line 56 when the pin 40 is in position.

Referring now to FIG. 11, there is shown therein a further modified form of the present invention having a bracket 14b having capstans 16, 18 and 20. The down line 12 is wrapped around the capstan 18, thence around the capstan 20 for frictional engagement of the bracket 14b with the down line 12. In this instance the bracket 14b has a pair of spaced extensions 82 having an opening 84 for reception of a pin 86 which passes through a central tab 88 integrally formed with a release assembly 26b which in all other respects is identical to the release assembly 26 of FIGS. 4 and 5. Like reference characters relate to like parts. In this form of the invention the release assembly 26b is permitted to move upwardly or downwardly in response to the movement of the fish, thus preventing premature release of the pin 40 until the proper pressure is attained.

The downrigger assembly of the present invention exhibits important advantages over downrigger assemblies heretofore known. For instance, the nature of the grasp is such that abrading of the fishing line is prevented. This is true because the pin 40, of plastic or the like, holds the fish line against the snubbing disc 48. When release occurs, the pin 40 swings aside and permits free release of the fishing line 56.

We claim:

1. A downrigger device for trolling comprising: a bracket body for engaging a weighted downline; a vertically bifurcated body extending from said bracket body providing laterally spaced arms; one of said laterally spaced arms being horizontally bifurcated providing vertically spaced tines; a pin member for releasably holding a fish line, said pin member pivotally connected at one end thereof to the distal end of the other of said spaced arms; receiving means provided at the distal ends of said tines to releasably retain therebetween the other end of said pin member; and a resilient member between said laterally spaced arms for contacting the body of said pin when said other end thereof is received between the distal ends of said tines.

2. A downrigger device for trolling comprising: a bracket body, said bracket body having a plurality of spaced, convexly curved members for engaging a weighted downline; a vertically bifurcated body pivotally connected to said bracket body providing laterally spaced arms; one of said laterally spaced arms being horizontally bifurcated providing vertically spaced tines; a pin member pivotally connected at one end thereof to the distal end of the other of said spaced arms; and receiving means provided at the distal ends of said tines to releasably retain therebetween the other end of said pin member.

3. A downrigger device for trolling comprising: a bracket body, said bracket body having a plurality of spaced, convexly curved members for engaging a weighted downline; a vertically bifurcated body extending from said bracket body providing laterally spaced arms; one of said laterally spaced arms being horizontally bifurcated providing vertically spaced laterally spaced tines; a pin member pivotally connected at one end thereof to the distal end of the other of said spaced arms; receiving means provided at the distal ends of said tines to releasably retain therebetween the other end of said pin member; and a resilient member between said laterally spaced arms extending to contact the body of said pin when said other end thereof is received between the distal end of said tines.

4. A bracket body for a downrigger device for trolling comprising: a plate body member; a plurality of convexly curved, capstan-like members spacedly fixed to said plate body member, said convexly curved part of said capstan-like members being beveled, the apex thereof being in a common plane; said capstan-like members being mounted on said plate body member to alternately face said convexly curved part of said capstan-like members in opposite directions to wedgingly engage a weighted downline between said beveled edges.

5. A device for releasably holding a trolled fish line, comprising: a vertically bifurcated body providing laterally spaced arms; one of said laterally spaced arms being horizontally bifurcated providing vertically spaced tines; a pin member for releasably holding a fish line, said pin member pivotally connected at one end thereof to the distal end of the other of said spaced arms; receiving means provided at the distal ends of said tines to releasably retain therebetween the other end of said pin member; and a resilient member between said laterally spaced arms extending to contact the body of said pin when said other end thereof is received between the distal ends of said tines.

* * * * *